United States Patent
Nakata et al.

(10) Patent No.: US 7,227,659 B2
(45) Date of Patent: Jun. 5, 2007

(54) PRINT CONTROLLER AND IMAGE FORMING APPARATUS

(75) Inventors: Hironobu Nakata, Itami (JP); Takeshi Morikawa, Itami (JP); Tatsuji Hirakawa, Aichi-Ken (JP); Hiroshi Sumiyama, Aichi-Ken (JP); Munetaka Fujita, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 813 days.

(21) Appl. No.: 09/969,148

(22) Filed: Oct. 3, 2001

(65) Prior Publication Data

US 2002/0063881 A1 May 30, 2002

(30) Foreign Application Priority Data

Oct. 12, 2000 (JP) .............................. 2000-312467
Aug. 29, 2001 (JP) .............................. 2001-259989

(51) Int. Cl.
*G06F 3/12* (2006.01)

(52) U.S. Cl. .................... 358/1.15; 358/1.14; 358/448; 399/23; 399/85

(58) Field of Classification Search ............... 358/1.14, 358/1.15, 448; 271/9.06; 399/23, 85
See application file for complete search history.

(56) References Cited

U.S. PATENT DOCUMENTS 5,081,595 A * 1/1992 Moreno et al. ............ 358/1.12
6,452,692 B1 * 9/2002 Yacoub ...................... 358/1.15
6,529,286 B1 * 3/2003 King .......................... 358/1.14

FOREIGN PATENT DOCUMENTS

| JP | 9-314925 | 12/1997 |
| JP | 10-17168 | 1/1998 |
| JP | 10017168 A * | 1/1998 |

\* cited by examiner

*Primary Examiner*—Aung S. Moe
*Assistant Examiner*—Andrew Lam
(74) *Attorney, Agent, or Firm*—Morrison & Foerster LLP

(57) ABSTRACT

It is determined in S202 whether or not a mismatch between the paper information for the job A and the paper information existing in the printer (the printer 1A, for example) has occurred, and if there is a mismatch between the two types of paper information, it is determined in S205 whether or not another job B exists in the queue. Where another job B exists in the queue, it is determined in S206 whether or not the job B is a job that uses the multi-purpose cassette 19. If the job B is a job that uses the multi-purpose cassette 19, it is determined in S208 whether or not paper that matches the paper information for the job B exists in the fixed-size paper supply cassette 18. If paper that matches the paper information for the job B exists in the fixed-size paper supply cassette 18 (the determination in S208 is YES), the fixed-size paper supply cassette 18 is selected in S212, printing is performed for one sheet in S213, and the use of the multi-purpose cassette 19 is prohibited and notification of such prohibition is issued in S214.

6 Claims, 6 Drawing Sheets

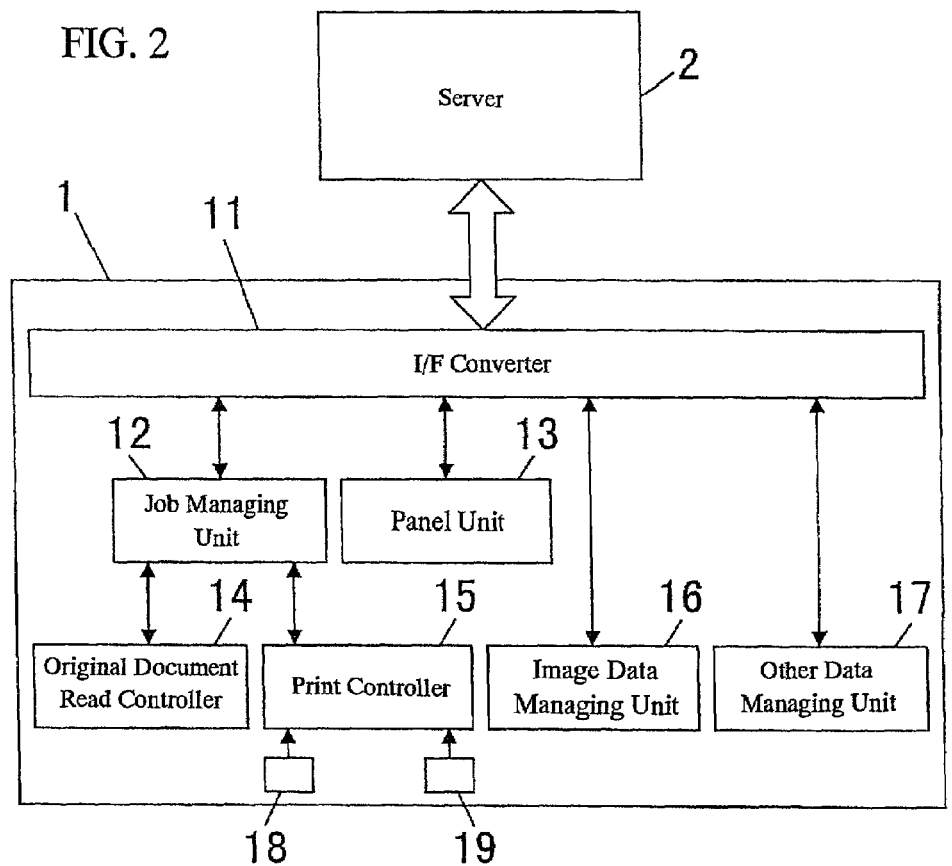
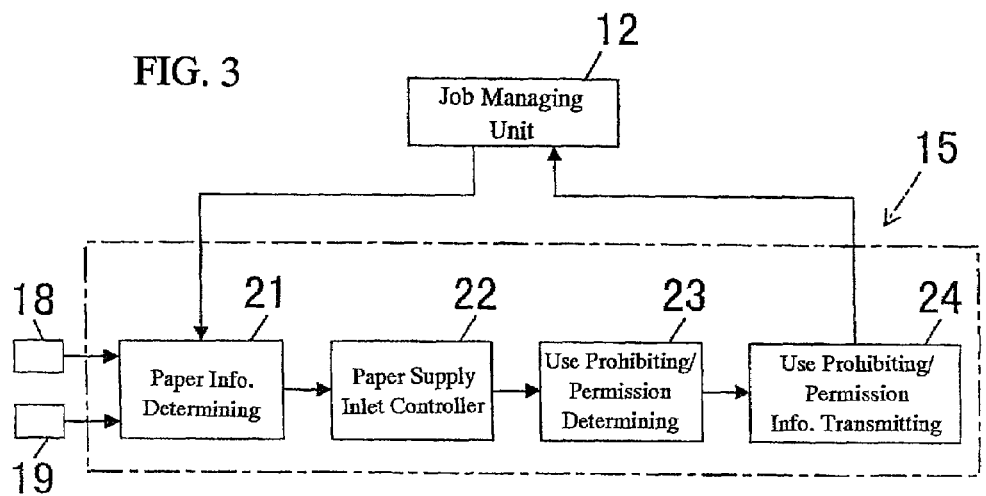

PRINT CONTROLLER AND IMAGE FORMING APPARATUS

This application is based on applications Nos. 2000-312467 and 2001-259989 filed in Japan, the content of which is hereby incorporated by reference.

BACKGROUND OF THE INVENTION

1. Field of the Invention

The present invention relates to a print controller and to an image forming apparatus.

2. Description of the Related Art

In the conventional art, when the paper information for a designated job does not match the paper information pertaining to the paper housed in the paper supply cassette in an image forming apparatus such as a printer, the apparatus is stopped so that a period of time may be secured during which paper can be loaded that matches the paper information for the designated job.

However, using the conventional construction, the apparatus is stopped when the paper information mismatch described above occurs, and therefore, the image forming operation for the jobs subsequently received is delayed for as long as the apparatus is held on hold, resulting in a reduced operation rate for the apparatus. At the same time, if image formation for the next jobs in the queue is carried out when the mismatch of paper information occurs, the timing for paper exchange may be lost.

For example, the Japanese Laid-Open Patent Applications Hei 10-17168 and Hei 9-314925 disclose a construction in which, when the paper information for the job and the paper information pertaining to the paper supply inlet are different, jobs that match the paper supply inlet paper information are processed first, but the timing for setting the appropriate paper is also lost in this case.

For example, where A4-size paper is housed in a first paper supply cassette that can house paper up to A3 size, and A4-size paper is housed in a second paper supply cassette that is dedicated to A4-size paper, a print job that uses A3-size paper cannot be printed. If a job that uses A4-size paper is located in the queue in this state, printing for that job is first performed using the A4-size paper in the first cassette. Consequently, the timing to load A3-size paper in the first cassette is lost, and as a result, the job that uses A3-size paper cannot be executed for a long time.

SUMMARY OF THE INVENTION

The present invention was made in view of the above situation, and provides a print controller and image forming apparatus that enables paper exchange while the printing operation continues, and that can perform image formation for the next jobs in the queue so that the reduction in the operation rate may be avoided.

According to one aspect of the present invention, the print controller for an image forming apparatus in which a multi-purpose cassette in which the type of paper housed therein can be changed can be mounted, together with another paper supply cassette, and which performs image formation for the jobs received, includes a paper information determining means that determines whether or not the paper information pertaining to the first job matches the paper information that exists in the image forming apparatus, as well as a paper supply control means that, if the two types of paper information are determined not to match each other in the above determination, prohibits the use of the multi-purpose cassette with regard to the second job in the queue and permits the use of the other paper supply cassette, which is not a multi-purpose cassette, until the two types of paper information match each other.

In this print controller, because the use of the multi-purpose cassette is prohibited and the use of the other paper supply cassette is permitted, the execution of image formation using the paper in the other paper supply cassette is enabled for the subsequent jobs in the queue. In addition, even during printing of a next job in the queue, a period of time may be secured during which to load in the multi-purpose cassette the paper that matches the job for which appropriate paper was determined not to exist in the apparatus.

According to one aspect of the present invention, comprises an image forming apparatus in which can be mounted a paper supply cassette housing paper of a prescribed size and multiple multi-purpose cassettes including first and second multi-purpose cassettes in which the type of paper housed therein may be changed, said image forming apparatus including: a first determining means that determines whether or not the paper information for the first job matches the paper information for the paper supply cassette; a first prohibiting means that, where the first determining means determines that the paper information does not match, stops the execution of the first job and prohibits the use of the first multi-purpose cassette; a second determining means that determines whether or not the paper information for the second job, which is executed subsequent to the first job, matches the paper information for the paper supply cassette; a third determining means that, where the second determining means determines that the paper information does not match, determines whether or not the paper information for the second job matches the paper information for the paper housed in the first multi-purpose cassette, the use of which is prohibited by the first prohibiting means; a canceling means that, where the third determining means determines that the paper information matches, cancels the prohibition of use of the first multi-purpose cassette, which was set by the prohibiting means; and a second prohibiting means that prohibits the use of the second multi-purpose cassette after the prohibition of use of the first multi-purpose cassette is cancelled by the canceling means.

According to one aspect of the present invention, comprises an image forming apparatus in which can be mounted a paper supply cassette housing paper of a prescribed size and multiple multi-purpose cassettes in which the type of paper housed therein may be changed, said image forming apparatus including: a first determining means that determines whether or not the paper information for the first job matches the paper information for the paper supply cassette; a first prohibiting means that, where the first determining means determines that the paper information does not match, stops the execution of the first job and prohibits the use of the first multi-purpose cassette; a second determining means that determines whether or not the paper information for the second job, which is executed after the first job, matches the paper information for the paper supply cassette; a third determining means that, where the second determining means determines that the paper information does not match, determines whether or not the paper information for the second job matches the paper information for the paper housed in the first multi-purpose cassette, the use of which is prohibited by the first prohibiting means; and a second prohibiting means that, where the third determining means determines that the paper information does not match, further prohibits the use of the second multi-purpose cassette.

BRIEF DESCRIPTION OF THE DRAWINGS

These and other objects and features of this invention will become clear from the following description, taken in conjunction with the preferred embodiments with reference to the accompanied drawings in which:

FIG. 2 is a block diagram showing the construction of the image forming apparatus of the image forming system;

FIG. 3 is a block diagram showing the print controller of the image forming apparatus;

DETAILED DESCRIPTION OF THE PREFERRED EMBODIMENTS

The embodiments of the present invention are explained below with reference to the drawings.

Figure 1:
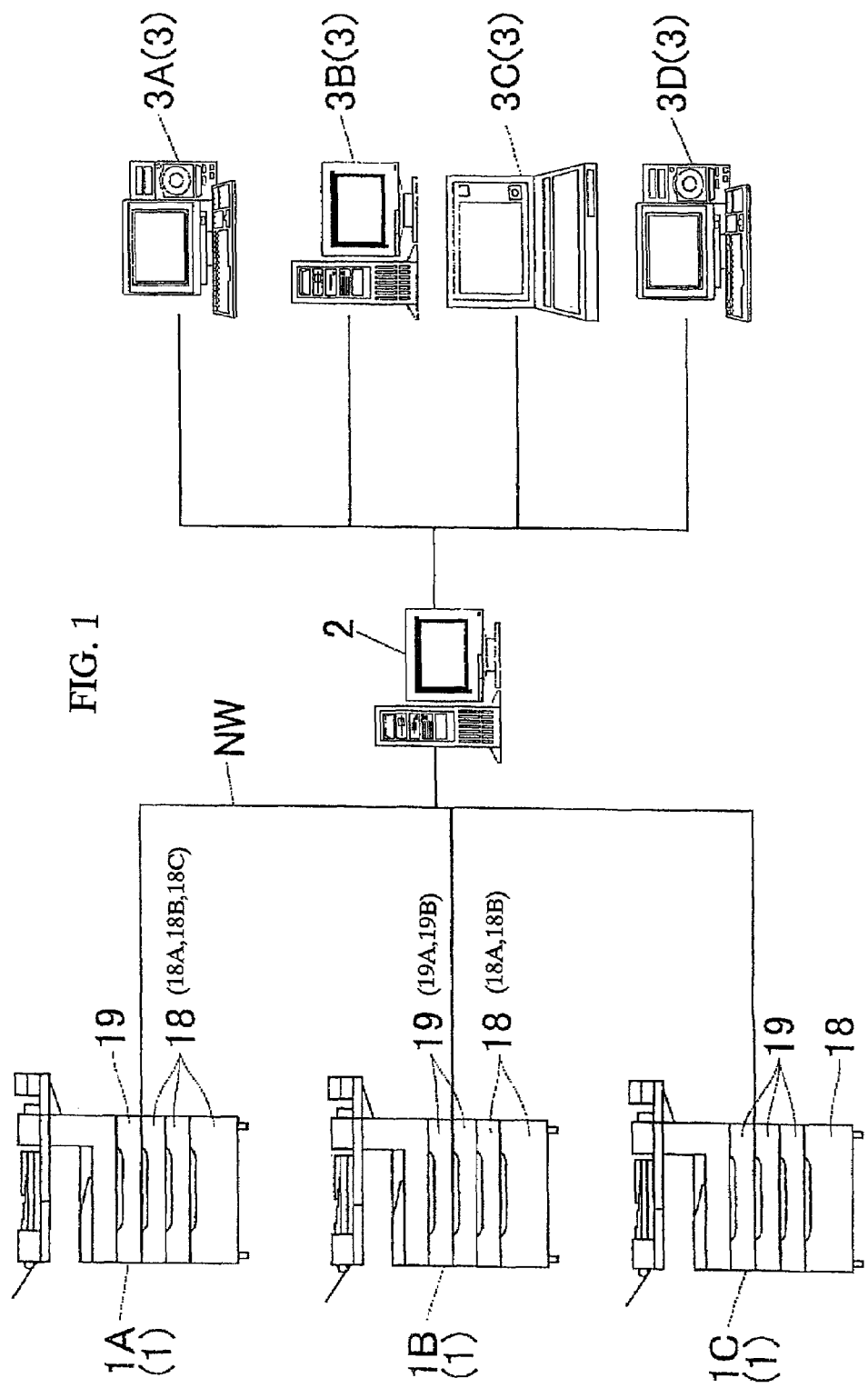
FIG. 1 is a drawing showing the construction of the image forming system pertaining to one embodiment.

FIG. 1 is a drawing showing the construction of the image forming system pertaining to one embodiment of the present invention.

In FIG. 1, a plurality of printers 1 (1A, 1B, 1C), which operate as image forming apparatuses, and client personal computers (hereinafter called 'PCs') 3 (3A, 3B, 3C, 3D) are connected to a host server machine 2, which is a host computer, via a network NW.

The printers 1 are the multi-function type machine having a digital copying function, a printer function and a facsimile function, for example, and as shown in FIGS. 1 and 2, in addition to the fixed-size paper supply cassettes 18 in which paper of a specific size is housed, multi-purpose cassettes (MPC) 19, in which the size and type of paper housed therein may be freely changed, are also mounted in the printers 1. In this embodiment, the printer 1A has one multi-purpose cassette 19 and three fixed-size paper supply cassettes 18. The printer 1B has two multi-purpose cassettes 19 and two fixed-size paper supply cassettes 18. The printer 1C has three multi-purpose cassettes 19 and one fixed-size paper supply cassette 18.

"Type of paper" in this explanation pertains to a concept that includes a difference in quality and use, such as regular paper, special paper and OHP sheets.

FIG. 2 is a block diagram showing the construction of the printers 1.

As shown in FIG. 2, a printer 1 includes an interface (IF) converter 11, a job managing unit 12, a panel unit 13, an original document read controller 14, a print controller 15, an image data managing unit 16 and an other data managing unit 17.

The IF converter 11 is an interface between the printer 1 and the host server machine 2. It hands over control signals and job data from the host server machine 2 to the printer 1, and it delivers status signals from the printer 1 to the host server machine 2.

The job managing unit 12 has a function to incorporate the designated job from the host server machine 2 via the IF converter 11 and temporarily store the job.

The panel unit 13 has a function to display various information from the host server machine 2 via the IF converter 11, and may be used for various mode settings.

The original document read controller 14 performs control regarding reading of the original document placed on the platen glass in accordance with the job data managed by the job managing unit 12, and converts the read data into image data. The print controller 15 controls the printing of the image data sent from the server 2 or read image data in accordance with the job data managed by the job managing unit 12.

The image data managing unit 16 manages the image data designated by the host server machine 2 via the IF converter 11. The other data managing unit 17 manages various data such as the image data designated by the host server machine 2 via the IF converter 11.

FIG. 3 is a block diagram showing the functional construction of the print controller 15.

In FIG. 3, the paper information determining portion 21 determines whether or not the paper information for the designated job matches the paper information residing in the printer 1, i.e., the information pertaining to the paper to be supplied from the multi-purpose cassette 19 and the fixed-size paper supply cassette 18. Where the paper information determining portion 21 determines that the two types of paper information do not match, the paper supply inlet controller 22 prohibits the use of the multi-purpose cassette 19 until they match, and at the same time permits the use of the fixed-size paper supply cassette 18.

The use prohibition/permission determining portion 23 determines from the results of control by the paper supply inlet controller 22 whether or not there is any change in the use prohibition/permission status regarding the multi-purpose cassette 19. Furthermore, the use prohibition/permission information transmitting unit 24 transmits the information regarding the determination as to whether or not there is a change in the use prohibition/permission status of the multi-purpose cassette 19 to the host server machine 2 via the job managing unit 12 and IF converter 11. Where information that the use of the multi-purpose cassette 19 is prohibited is received by the host server machine 2, for example, the host server machine 2 performs operations necessary to (i) ensure a period of time during which to place appropriate paper in the multi-purpose cassette 19 and (ii) search for another printer 1 that is available for printing for the next job in the queue.

In this controller 15, specifically, when there is no paper that matches the first job requirement, and if the next job in the queue can be printed without using the multi-purpose cassette 19, the next job in the queue is printed first.

For example, where the paper information for a job designated by any of the PCs 3A through 3D matches the paper information pertaining to the multi-purpose cassette 19 as well as the paper information pertaining to the fixed-size paper supply cassette 18, printing is performed using the paper in the fixed-size paper supply cassette 18.

On the other hand, where the paper to be used by the next job in the queue does not exist in the printer 1A and printing is not possible unless appropriate paper is loaded in the multi-purpose cassette 19, for example, a printer that may perform the subject printing is sought from among the other printers 1B and 1C, which are connected to the network NW, and printing may be performed using that printer.

The determination as to whether or not the paper information for the designated job matches the paper information existing in the printer 1 and the determination to prohibit the use of the multi-purpose cassette 19 may be made not only by the print controller 15 but also by another member of the printer 1 or any component of the system, including the host server machine 2. In that case, the freedom in design regarding the construction for the above determination increases.

Figure 4:
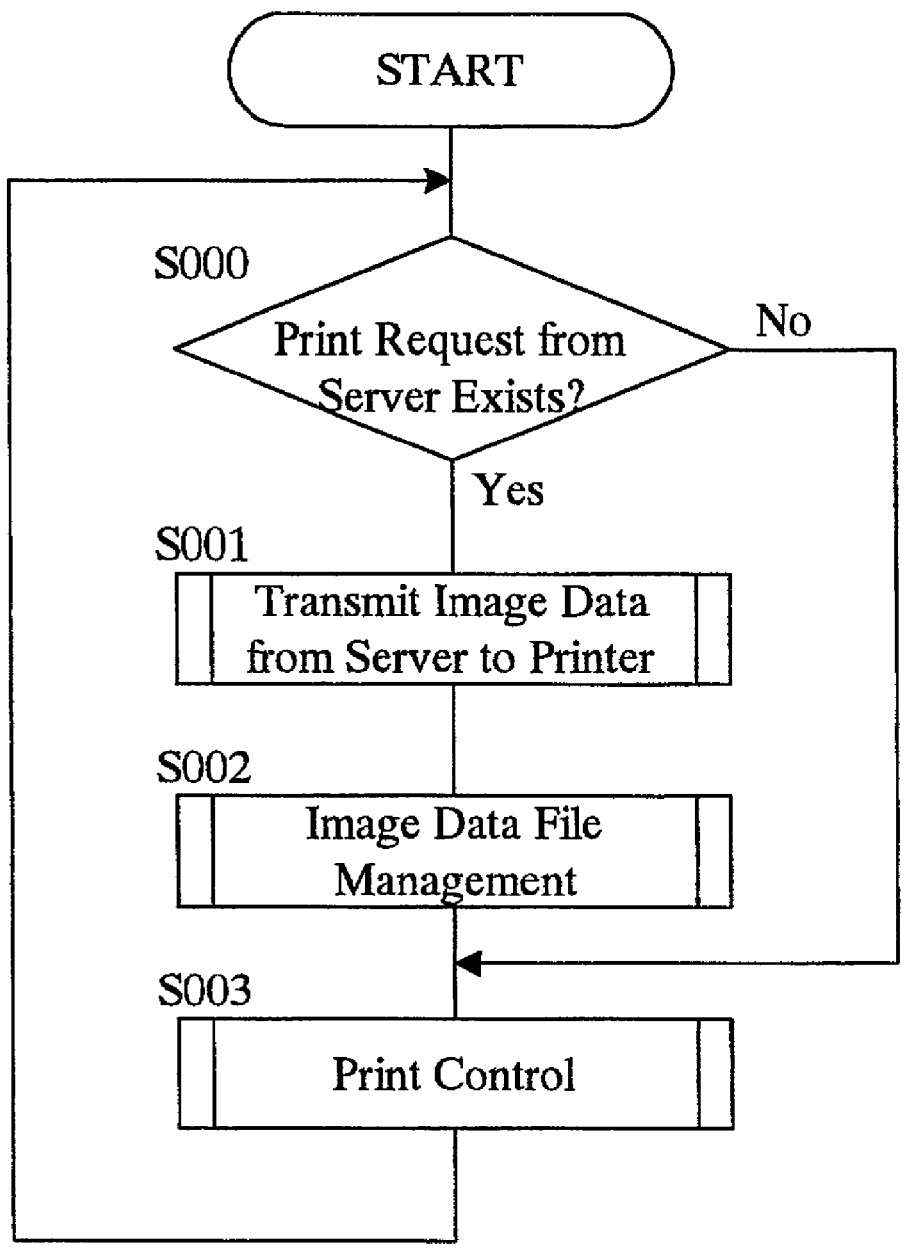
FIG. 4 is a flow chart showing the sequence of the basic processing carried out in the image forming system.

The sequence of the basic processing carried out in the image forming system having the above construction will now be explained with reference to the flow chart of FIG. 4. In the explanation below and the drawings, 'step' is abbreviated as 'S'.

It is determined in S000 whether or not a print request from the host server machine 2 exists, and if it exists (the determination in S000 is YES), control is performed in S001 to transmit image data from the host server machine 2 to the printer 1. In S002, file management control regarding the image data is carried out in the printer 1, and in S003, the print controller 15 performs image data control in accordance with the job. Where no print request exists (the determination in S000 is NO), the system stands by in S003.

Figure 5:
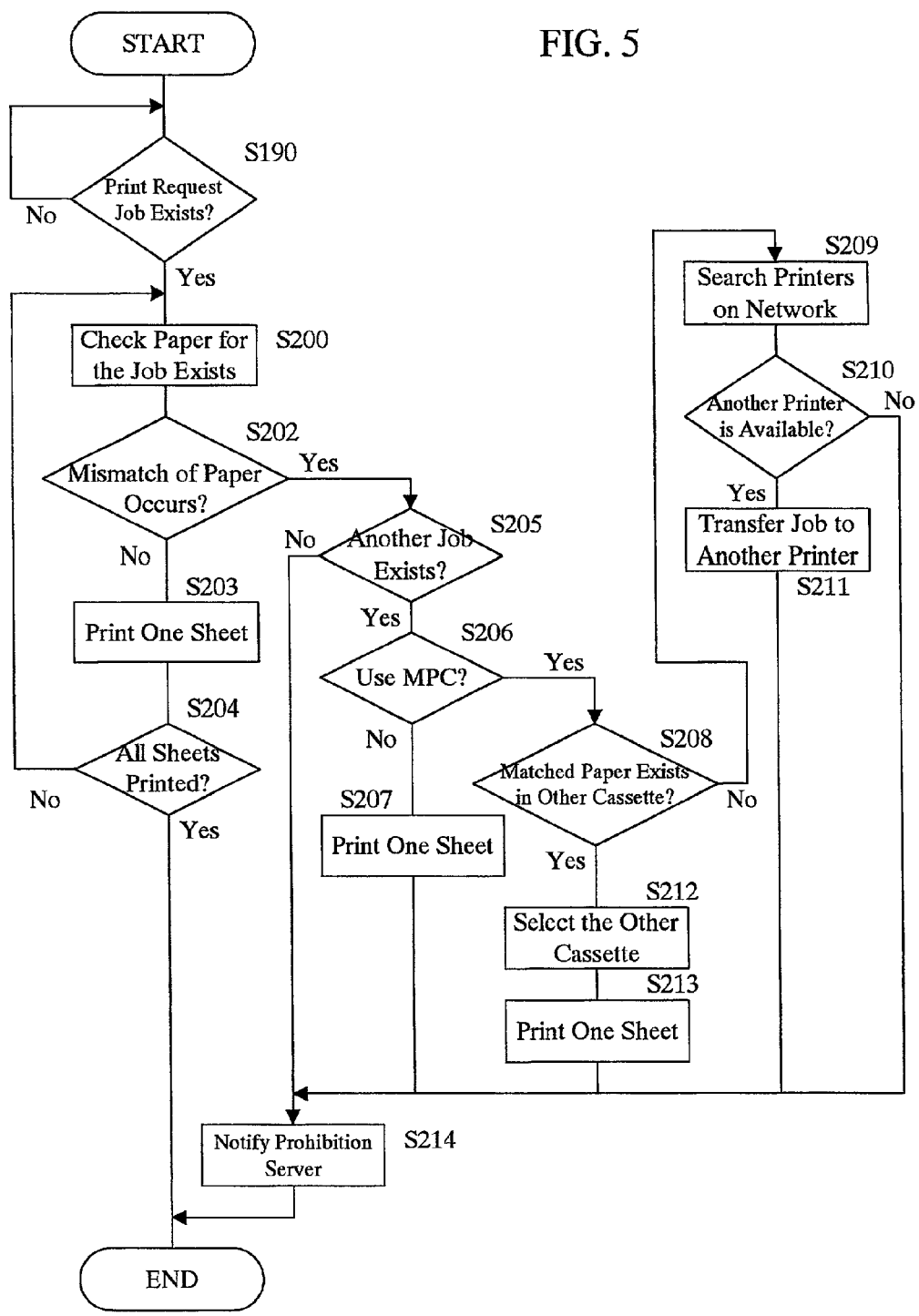
FIG. 5 is a flow chart showing the sequence of the processing carried out by the print controller of the image forming apparatus.

The sequence of the processing carried out by the print controller 15 will now be explained with reference to the flow chart of FIG. 5.

In S190, it is determined whether or not a print request for the job designated by the host server machine 2 exists, and where a print request for the designated job (deemed 'job A') exists (the determination in S190 is YES), it is checked in S200 whether or not paper that matches the requirements of the designated job A exists in the paper supply inlet 18 or 19 of the printer 1. If a print request for the designated job A does not exist (the determination in S190 is NO), the system stands by in S190.

In S202, it is determined whether or not a mismatch of the paper information for the job A and the paper information existing in the printer (the printer 1A, for example) has occurred, and if no mismatch has occurred between the two types of paper information (the determination in S202 is NO), printing of the designated job A is performed in S203 for one sheet, using appropriate paper, and it is determined in S204 whether or not all printing has been completed. Where all printing has been completed (the determination in S204 is YES), the process comes to an end, and where all printing has not been completed (the determination in S204 is NO), the system returns to S200 and the processes of S200 through S204 are repeated.

Where there is a mismatch between the above two types of paper information (the determination in S202 is YES), it is determined in S205 whether or not another job (deemed 'job B') exists in the queue. Where no other jobs B exist in the queue (the determination in S205 is NO), the information that the use of the multi-purpose cassette 19 is prohibited is transmitted to the host server machine 2 in S214.

Consequently, the host server machine 2 causes the user's PC 3 to display such information in order to urge the user to load paper in the multi-purpose cassette 19 that matches the paper information for the designated job A. The user can load the paper upon viewing the display.

Where another job B exists in the queue (the determination in S205 is YES), it is determined in S206 whether or not the job B in the queue is a job that uses the multi-purpose cassette 19. Where it is not a job that uses the multi-purpose cassette 19 (the determination in S206 is NO), printing of the job B in the queue is performed for one sheet, and the system advances to S214. In other words, while performing printing of the other job B in the queue that does not use the paper in the multi-purpose cassette 19, the system notifies the user in S214 such that the user will load paper that matches the paper information for the job A in the multi-purpose cassette 19 for the job A regarding which a paper mismatch occurred.

Where the job B is a job that uses the multi-purpose cassette 19 (the determination in S206 is YES), it is determined in S208 whether or not paper that matches the paper information for the job B exists in the fixed-size paper supply cassette 18. Where paper that matches the paper information for the job B exists in the fixed-size paper supply cassette 18 (the determination in S208 is YES), the fixed-size paper supply cassette 18 is selected in S212, printing for one sheet is performed in S213, and the system advances to S214. In other words, if the job B is a job that can use the paper in the multi-purpose cassette 19 but printing using the fixed-size paper supply cassette 18 is possible, the use of the multi-purpose cassette 19 is prohibited with regard to the printing of the other job B in the queue while printing is continued using the fixed-size paper supply cassette 18. In this way, for the job A regarding which a paper mismatch occurred, the use of the multi-purpose cassette 19 is prohibited such that a period of time may be ensured during which the paper that matches the paper information for the job A may be loaded in the multi-purpose cassette 19, and notification regarding the prohibition is issued in S214.

Where paper that matches the paper information for the job B does not exist in the fixed-size paper supply cassette 18 (the determination in S208 is NO), the other printers 1B and 1C on the network NW are checked. Subsequently, in S210, it is determined whether or not there is another printer that is available for printing, and if there is such a printer (the determination in S210 is YES), the job B is transferred in S211 to the other printer that is available for printing, i.e., the printer 1B, for example, and the system moves on to S214. If there are no other printers that are available for printing (the determination in S210 is NO), the system advances to S214.

Where there is a next job in the queue when a paper information mismatch exists for one job, even if the next job in the queue is a job for which the paper in the multi-purpose cassette 19 can be used, the use of the multi-purpose cassette 19 is prohibited, and printing of the next job in the queue is performed first using the fixed-size paper supply cassette 18 or another printer 1. Therefore, a reduction in the operation rate of the printer may be avoided, and through the prohibition of the use of the multi-purpose cassette 19, a period of time may be secured during which the paper in the multi-purpose cassette 19 may be changed for the job A.

To describe a specific example, the multi-purpose cassette 19 can house paper up to A3-size, for example, and it now has A4-size paper. The first fixed-size paper supply cassette 18A is used for A4-size paper only, and the second fixed-size paper supply cassette 18B is for letter-size paper only.

With these cassettes mounted in the printer, a first job A is received. If the job A is a job for which printing should be made using A3-size paper, because A3-size paper is not housed in any of the cassettes, printing cannot be performed, and it is necessary to load A3-size paper in the multi-purpose cassette 19. A job B, for which printing should be made using A4-size paper, is then received. A4-size paper is housed in both the multi-purpose cassette 19 and the fixed-size paper supply cassette 18A. However, because A3-size paper must be placed in the multi-purpose cassette 19 for the job A, the use of the multi-purpose cassette 19 is prohibited with regard to the job B, and printing of the job B is executed using the A4-size paper in the fixed-size paper supply cassette 18A.

To explain in more detail, a first job A is input. While the job A is a job that uses A3-size paper, since A3-size paper is not housed in any of the cassettes, printing cannot be executed. Therefore, the use of the multi-purpose cassette 19 is prohibited to allow the user to load A3-size paper in the multi-purpose cassette 19, and the system waits for A3-size paper to be loaded therein. A second job B is then input. The job B is a job that uses A4-size paper. In this case, while A4-size paper is housed in the multi-purpose cassette 19, because the use thereof is now prohibited, the job is executed using the A4-size paper housed in the fixed-size paper supply cassette 18A.

If the multi-purpose cassette were used for the job B, the interval in which A3-size paper could be placed in the multi-purpose cassette would be lost, and the job A could not be executed for a long time. However, through the above operation in which the job B is executed first using the fixed-size paper supply cassette, not only can the printer be efficiently used, but a period of time during which to load the paper necessary for the job A, which is waiting for paper supply, may be ensured because the multi-purpose cassette 19 is not used.

In addition, when a job C that uses postcard-size paper is input, because postcard-size paper is not housed in any of the cassettes, the other printers connected to the network are checked.

Figure 6:
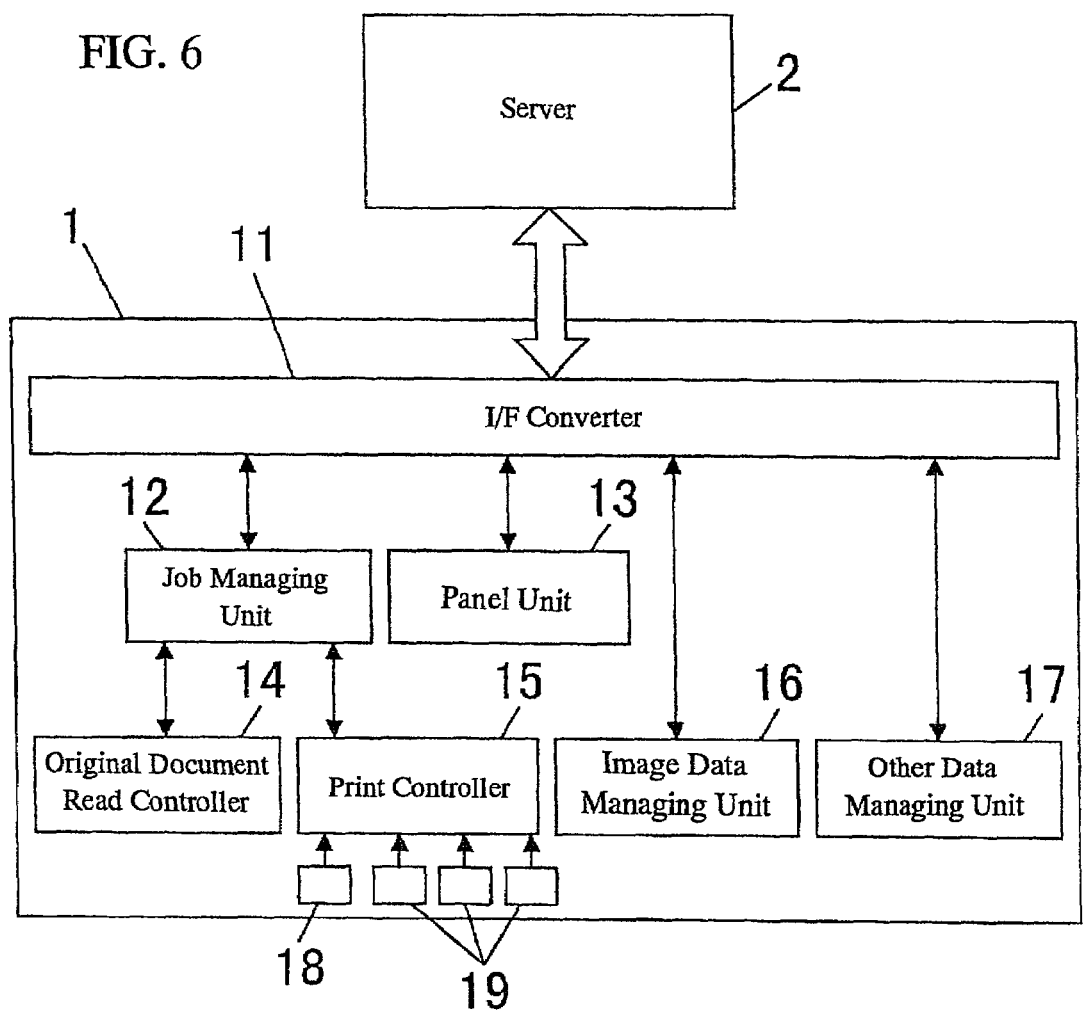
FIG. 6 is a drawing showing the construction of the image forming apparatus pertaining to another embodiment.

FIG. 6 is a block diagram showing the construction of the printer of another embodiment. The same numbers are used for the same or equivalent members as in FIG. 2, and explanation thereof is omitted.

The printer shown in FIG. 6, like the printer 1B shown in FIG. 1, has multiple multi-purpose cassettes 19 (19A, 19B). When the use of the multi-purpose cassette 19A is already prohibited and the paper information of the multi-purpose cassette 19A does not match the paper information for the next job (deemed 'job C'), the paper supply inlet controller 22 of the print controller 15 prohibits the use of the other multi-purpose cassette 19B as well. Where the two types of paper information match, control is performed such that the prohibition of use of the multi-purpose cassette 19A, in which appropriate paper is housed, is cancelled, and the use of the multi-purpose cassette 19B is prohibited. It is assumed here that the use of the multi-purpose cassette 19A is prohibited because the paper required for the print job already received does not exist in the printer.

Figure 7:
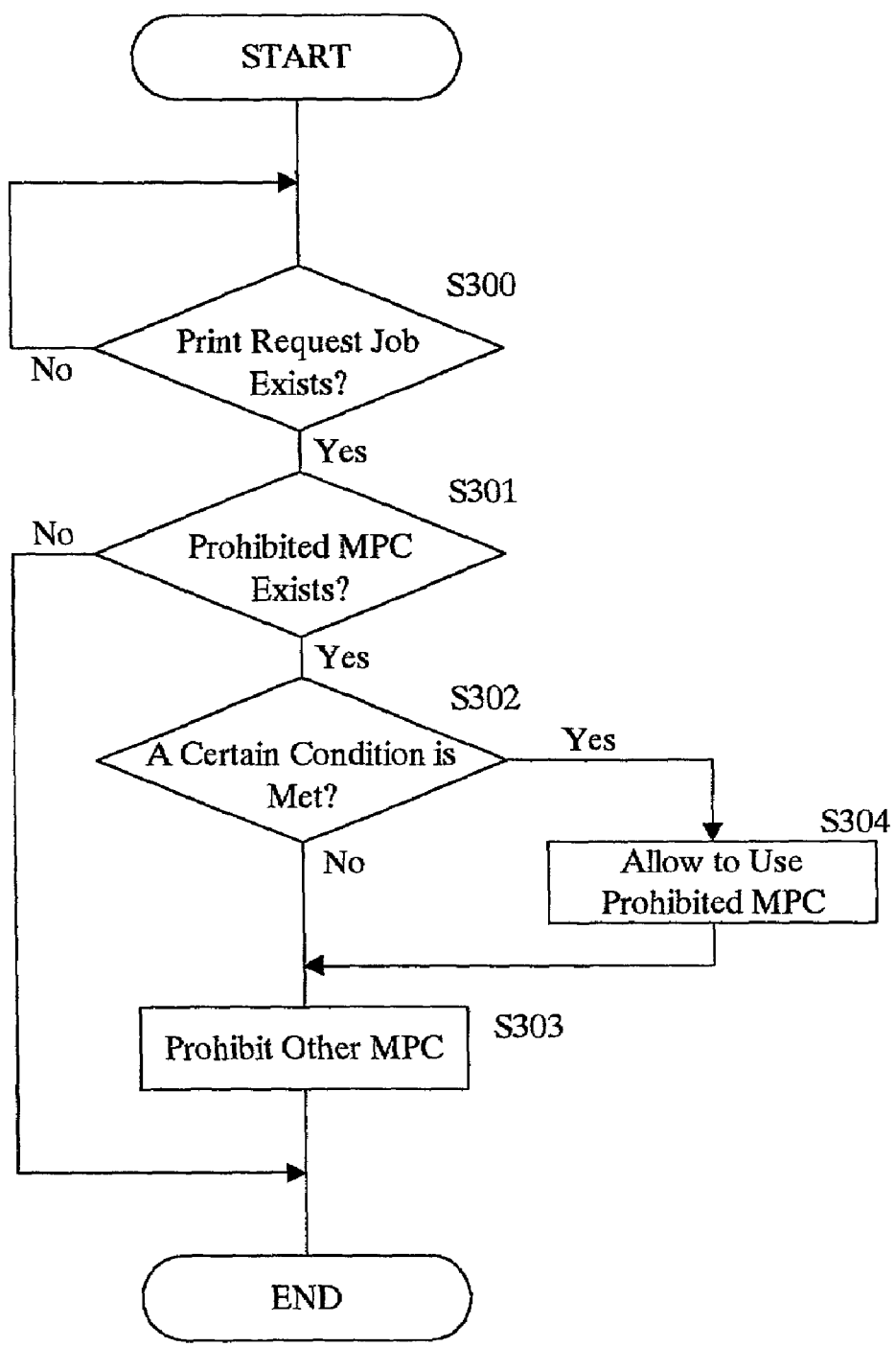
FIG. 7 is a flow chart showing the sequence of the processing carried out by the print controller of the image forming apparatus shown in FIG. 6.

The sequence of the processes carried out in this construction will now be explained with reference to the flow chart of FIG. 7.

It is determined in S300 whether or not there is a print request from the host server machine 2 for the designated job C, and if there is a print request for the designated job C (the determination in S300 is YES), it is determined in S301 whether or not there is a multi-purpose cassette 19 that is prohibited from use. If there is no print request for the designated job C (the determination in S300 is NO), the system stands by in S300.

Where there is a multi-purpose cassette 19 that is prohibited from use (the determination in S301 is YES), it is determined in S302 whether or not a certain condition is met. That is, it is determined whether or not the information regarding the paper housed in the multi-purpose cassette 19 (19A, for example), the use of which is prohibited, matches the paper information for the job C.

If the two types of information do not match (the determination in S302 is NO), the use of the other multi-purpose cassette 19B is prohibited in S303, and the process comes to an end. Conversely, where the two types of information match (the determination in S302 is YES), the prohibition of use of the multi-purpose cassette 19A is cancelled in S304 such that it can be used, the use of the other multi-purpose cassette 19B is prohibited, and the system moves on to S303.

Using this construction, among the multiple multi-purpose cassettes, the prohibition of use of the multi-purpose cassette in which appropriate paper is housed is cancelled and image formation is performed for the job using the paper in that multi-purpose cassette, the prohibition of use of which has been cancelled, and therefore a print job may be speedily executed without reducing the operation rate of the printer. In other words, in this case, printing of a job in the queue may be executed without the need to load appropriate paper in the multi-purpose cassette.

To describe a specific example, let us assume that the printer has multi-purpose cassettes 19A and 19B as well as a fixed-size paper supply cassette 18, for example. The first multi-purpose cassette 19A can accommodate paper up to A3-size paper, and now houses A5-size paper. The second multi-purpose cassette 19B can accommodate paper up to A3-size paper, and now houses postcard-size paper. The fixed-size paper supply cassette 18 can house A4-size paper only.

First, if there is a print request for the designated job in S300, the paper size required for the job A (A3) is compared with the size (A4 in this example) of the paper housed in the fixed-size paper supply cassette 18, which is not a multi-purpose cassette. Here because the paper sizes do not match and therefore the paper supply cassette 18 cannot be used, the multi-purpose cassette 19A is prohibited from use.

The purpose of prohibiting the use of the multi-purpose cassette 19A is to secure a period of time during which paper that matches the paper size required for the job A can be loaded in the multi-purpose cassette 19A, i.e., to give the user the opportunity to replace the A5-size paper currently housed in the multi-purpose cassette with A3-size paper that matches the paper size requirement for the job A.

Therefore, in this case, printing of the job A is suspended until paper of the appropriate size is housed in the multi-purpose cassette 19A.

While the job A is on hold, the operation to execute a job D, which is a next job in the queue, is begun. The job D is a job that uses A5-size paper. Because the multi-purpose cassette 19A is already prohibited from use, the determination in S301 becomes YES, and the system moves onto S302.

For the job D, the paper size for that job (A5) is compared with the size of the paper (A4) housed in the fixed-size paper supply cassette 18 (not a multi-purpose cassette), as in the case of the job A. Here, because the paper sizes do not match, a multi-purpose cassette is ordinarily prohibited from use, but if the multi-purpose cassette 19A is already prohibited from use, and if the size of the paper housed in the multi-purpose cassette 19A, which is already prohibited from use and the paper (paper size) in which has not yet been replaced (changed) matches the job D, the prohibition of use thereof is cancelled such that printing operation may be immediately begun.

Specifically, because the paper size (A5) required for the job D and the paper size (A4) in the fixed-size paper supply cassette 18 do not match, the paper size requirement for the job D is compared with the size of the paper housed in the multi-purpose cassette 19A, which is already prohibited from use for the job A (S302). Here because the multi-purpose cassette 19A houses A5-size paper, which matches the job D paper requirement in this example, printing of the job D is possible using this multi-purpose cassette 19A, and therefore the prohibition of use of the multi-purpose cassette 19A is cancelled such that the cassette can be used. In other words, although the multi-purpose cassette 19A was once prohibited from use for the job A, because printing may be carried out for the job D using this cassette without replacing the paper housed therein, the prohibition of use thereof is cancelled.

Instead, in order to enable printing of the job A, the use of the multi-purpose cassette 19B is newly prohibited so that a period of time may be secured during which paper that matches the paper size requirement for the job A can be placed in the cassette. For example, because the paper currently housed in the multi-purpose cassette 19B is postcard-size paper, an opportunity is provided to load in the multi-purpose cassette 19B A4-size paper that matches the job A paper size requirement.

Where the paper required for another job in the queue (job E) is letter-size paper, there is no match regardless of whether the paper size requirement for the job E is compared with the size of the paper in the paper supply cassette 18 or is compared with the size of the paper in the multi-purpose cassette 19A in S302. In this case, the system advances to S303, in which the use of the other multi-purpose cassette 19B is prohibited.

In other words, while the essence of this embodiment is that the use of the multi-purpose cassette is prohibited where the paper size requirement does not match the size of the paper housed in the paper supply cassette 18 regarding either the job A or D, if the paper size requirement for another job in the queue (the job D in the above example) happens to match the size of the paper housed in the multi-purpose cassette 19A, which is already prohibited from use, that multi-purpose cassette is used, allowing printing to be quickly initiated without paper replacement. Instead, the other multi-purpose cassette 19B is prohibited from use for the job A. In addition, where there is no paper that matches the paper size requirement for the next job in t he queue (the case of the job E in the above example), both of the two multi-purpose cassettes are prohibited from use.

The image forming apparatus that can be used in the above embodiments is not limited to a multi-function printer, and may be applied in a regular printer as well.

As explained above, when there is a job for which appropriate paper does not exist, the use of the multi-purpose cassette is prohibited with regard to the subsequent job in the queue, and therefore a period of time may be ensured during which paper that matches the job's paper size requirement can be loaded in the multi-purpose cassette. Furthermore, because the use of the paper supply cassette other than the multi-purpose cassette is permitted, image formation may be executed for the next job in the queue using the paper in the other paper supply cassette. Therefore, a period of time during which the paper is replaced may be secured without reducing the operation rate of the printer.

In addition, where the information regarding the paper housed in the currently prohibited multi-purpose cassette does not match the paper information for the designated job, another multi-purpose cassette is prohibited from use, and therefore paper replacement may be carried out using the other multi-purpose cassette. At the same time, where the two types of paper information match, the prohibition of use of the multi-purpose cassette in which appropriate paper is housed is cancelled, and therefore execution of speedy printing for the job is enabled using the multi-purpose cassette, the prohibition of use of which has been cancelled.

Obviously, many modifications and variation of the present invention are possible in light of the above teachings. It is therefore to be understood that within the scope of the appended claims, the invention may be practiced other than as specifically described.

What is claimed is:

1. A print controller for an image forming apparatus having a multi-purpose cassette capable of housing various types of paper and another paper supply cassette, and which performs image formation for the jobs received, comprising:
   a paper information determiner for determining whether a type of paper information pertaining to a first job matches any one of all types of paper information indicating all types of paper housed in said multi-purpose cassette and another paper supply cassette; and
   a paper supply controller for, when it is determined that the type of paper information pertaining to the first job does not match any one of all types of paper information indicating all types of paper housed in said multi-purpose cassette and another paper supply cassette, prohibiting use of the multi-purpose cassette with regard to a second job in a queue and permitting use of the other paper supply cassette until the type of paper information pertaining to the first job matches a type of paper information indicating a type of paper housed in the multi-purpose cassette.

2. The print controller as claimed in claim 1,
   wherein the print controller starts image formation for the first job when it is determined that paper matching the first job is loaded in the multi-purpose cassette.

3. The print controller as claimed in claim 1,
   wherein the print controller searches an available paper supply cassette of an image forming apparatus on a network when the other paper supply cassette does not exist.

4. The print controller as claimed in claim 1, wherein the print controller notifies a server that use of the multi-purpose cassette is prohibited.

5. An image forming apparatus including a paper supply cassette housing paper of a prescribed size and at least first and second multi-purpose cassettes housing various types of paper, the image forming apparatus comprising:
   a first paper information determiner for determining whether paper information for a first job matches paper information for the paper supply cassette;
   a first paper supply controller for, when the first paper information determiner determines that the paper information for the first job does not match the paper information for the paper supply cassette, stopping execution of the first job and prohibiting use of the first multi-purpose cassette;
   a second paper information determiner for determining whether the paper information for a second job, which is executed subsequent to the first job, matches the paper information for the paper supply cassette;
   a third paper information determiner for, when the second paper information determiner determines that the paper information for the second job does not match the paper information for the paper supply cassette, determining whether the paper information for the second job matches the paper information for paper housed in the first multi-purpose cassette, the use of which was prohibited by the first paper supply controller;
   a canceling portion for, when the third paper information determiner determines that the paper information matches, canceling the prohibition of use of the first multi-purpose cassette; and a second paper supply controller for prohibiting the use of the second multi-purpose cassette when the prohibition of use of the first multi-purpose cassette is cancelled by the canceling portion.

6. An image forming method, including mounting a paper supply cassette for paper of a prescribed size and first and second multi-purpose cassettes for various types of paper, the image forming method comprising:

determining whether paper information for a first job matches paper information for the paper supply cassette;

if the paper information for the first job does not match the paper information for the paper supply cassette, stopping execution of the first job and prohibiting use of the first multi-purpose cassette;

determining whether the paper information for a second job, which is executed after the first job, matches the paper information for the paper supply cassette;

if the paper information for the second job does not match the paper information for the paper supply cassette, determining whether the paper information for the second job matches the paper information for the paper housed in the first multi-purpose cassette, the use of which was prohibited, and if the paper information for the second job does not match the paper information for the paper housed in the first multi-purpose cassette, prohibiting use of the second multi-purpose cassette.

* * * * *